United States Patent [19]

Okada

[11] Patent Number: 5,790,099
[45] Date of Patent: Aug. 4, 1998

[54] DISPLAY DEVICE

[75] Inventor: Hiroyuki Okada, Sakai, Japan

[73] Assignee: Minolta Co., Ltd., Osaka, Japan

[21] Appl. No.: 912,458

[22] Filed: Aug. 18, 1997

Related U.S. Application Data

[63] Continuation of Ser. No. 436,881, May 8, 1995, abandoned.

[30] Foreign Application Priority Data

May 10, 1994 [JP] Japan .................. 6-096265

[51] Int. Cl.$^6$ .................................. G09G 5/08
[52] U.S. Cl. .................. 345/157; 345/8; 351/209; 348/78; 340/825.19
[58] Field of Search .................. 345/7, 8, 31, 157, 345/32, 158; 340/825.19; 341/31; 348/78; 351/209, 210; 364/550, 413.01; 382/103, 171, 291; 250/221

[56] References Cited

U.S. PATENT DOCUMENTS

| | | | |
|---|---|---|---|
| 4,934,773 | 6/1990 | Becker | 350/6.6 |
| 5,070,883 | 12/1991 | Kasahara | 351/209 |
| 5,253,008 | 10/1993 | Konishi et al. | 354/402 |
| 5,331,149 | 7/1994 | Spitzer et al. | 345/7 |
| 5,382,989 | 1/1995 | Uomori et al. | 351/209 |
| 5,467,104 | 11/1995 | Furness, III et al. | 345/8 |
| 5,481,622 | 1/1996 | Gerhardt et al. | 345/158 |

FOREIGN PATENT DOCUMENTS

| | | |
|---|---|---|
| 63-210613 | 9/1988 | Japan . |
| 3-168623 | 7/1991 | Japan . |
| 4-236935 | 8/1992 | Japan . |
| 6-109964 | 4/1994 | Japan . |

*Primary Examiner*—Amare Mengistu
*Attorney, Agent, or Firm*—Sidley & Austin

[57] ABSTRACT

A display device for a computer comprises a display on which an image is displayed, a gazing line detection unit which detects a direction of a gazing line of an observer who observes the display, and a processor which executes prescribed processing based on the direction of the gazing line detected by the gazing line detection unit and the state of the displayed image on the display.

28 Claims, 9 Drawing Sheets

DISPLAY DEVICE

CROSS REFERENCE TO RELATED APPLICATION

This is a continuation of U.S. patent application Ser. No. 08/436,881 filed May 8, 1995, now abandoned.

BACKGROUND OF THE INVENTION

1. Field of the Invention

This invention pertains to a display device, and more particularly to a display device equipped with a function to input the gazing line, which is convenient as a display device for data processing equipment such as computers and electronic notebooks, particularly small units for personal use.

2. Description of the Related Art

In recent years, the use of data processing equipment such as personal computers has rapidly increased, and along with the spread in its popularity, the equipment itself has progressed markedly in terms of its becoming increasingly compact and lightweight. In the area of personal computers, for example, the computer has become increasingly compact, from the desktop type which is kept on the desk at all times to the laptop type which can be folded when not in use, then to the convenient and portable book type, as well as the notebook type, which is a thinner version of the book type. Even a pocket computer that can be easily carried has recently been developed by selecting a limited number of functions available in the computer.

One issue raised by this trend toward compactness is the choice of input means. In other words, for desktop and laptop type computers, inputting can be performed using a mouse or pen, in addition to the keyboard, and the input operation can be performed relatively easily regardless of which input means is used. However, in the case of the notebook and pocket types, because the keyboard itself is smaller in size, complete dependence on key-based inputting limits processing efficiency.

Consequently, notebook or pocket type computers in which inputting can also be performed using a mouse are becoming increasingly popular. However, when using a mouse, a platform on which to move the mouse is required, giving rise to the inconvenience that the computer cannot be used unless a table or substitute is available. Some models are equipped with a track ball as an input means, for example, which allows them to be used without a table for operating the mouse, but their ease of use is clearly considerably less than those having an input means such as a mouse, etc. The same holds true with regard to pen-touch inputting. In addition, when the computer main unit is small, as in the case of the pocket type, the display device using an LCD, etc. is also small, so the amount of information displayed is limited.

In order to resolve these problems, a construction is provided in which the gazing line of the user is detected and data processing on the display screen may be performed based on the result of said detection. Conventionally, as a device invented for this purpose, a camera finder equipped with a function to detect the gazing line, which is used to convey the AF area, etc. to the camera, has been proposed.

More specifically, optical equipment such as cameras, etc. equipped with a gazing line detection means as described above are disclosed in such Japanese Laid-Open Patents as Hei 3-168623 and Hei 4-236935. In these examples of the prior art, an adjustment mode is used to correct the discrepancy between the direction of the gazing line detected by the gazing line detection means and the actual direction of the gazing line. In this adjustment mode, adjustment takes place according to a prescribed sequence of, for example, pressing a button while looking at a prescribed point. In addition, additional movement of the gazing line is also required for the adjustment.

In other words, in the gazing line detection means incorporated in a camera, as in said examples of the prior art, because the optical characteristics of the eye vary from person to person, it is necessary to set the adjustment mode and obtain correction data through measurement of the observer's eye characteristics, based on which data the direction of the gazing line is corrected. When this is done, if the adjustment operation regarding the direction of the gazing line is completed in one session only, it is not so problematic. However, due to measurement errors, etc. during the adjustment, one operation is usually not enough to achieve complete correction. This often results in a bothersome discrepancy between the actual direction of the gazing line and the detected direction of the gazing line in spite of the adjustment operation having been performed.

Even if accurate adjustment is achieved after a single operation, a discrepancy may occur in the direction of the gazing line if the observer uses contact lenses after the adjustment, or on account of other environmental changes. In such a case, it has conventionally been necessary to go into the adjustment mode again and perform adjustment using a designated method in order to correct the correction data, which is inconvenient in terms of use.

SUMMARY OF THE INVENTION

The main object of the present invention is to provide a display device that detects the gazing line of the user of a data processing apparatus such as a personal computer and that is capable of performing data processing on the display screen in accordance with the detection result.

The object of the present invention is achieved by providing a display device for a computer, comprising a display on which an image is displayed, gazing line detection means for detecting a direction of a gazing line of an observer who observes said display, and processing means for executing prescribed processing based on the direction of the gazing line detected by said gazing line detection means and the state of the displayed image on said display.

Another object of the present invention is to provide a display device having said gazing line detecting function, which is capable of correcting discrepancies in the detection of the gazing line through a simple operation.

Yet another object of the present invention is achieved by providing a display device comprising display on which an image is displayed,gazing line detection means for detecting a direction of a gazing line of an observer who observes said display, a memory which saves correction data regarding a discrepancy between the detected direction of the gazing line and an actual direction of the gazing line,correction means which corrects the direction of the gazing line based on the data saved by said memory,display control means which displays a position of the gazing line on said display based on the direction of the gazing line corrected by said correction means,adjustment instructing means for instructing a start of an adjustment and an end of the adjustment, displayed position storage means for storing the position of the gazing line displayed by said display control means when said adjustment instructing means instructs the start of the adjustment,calculation means which calculates the correction data regarding the discrepancy between the position of the gazing line stored by said displayed position storage means and the detected direction of the gazing line when said adjustment instructing means instructs the end of the adjustment, and conversion means which converts the correction data saved in said memory means into the correction data calculated by said calculation means.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
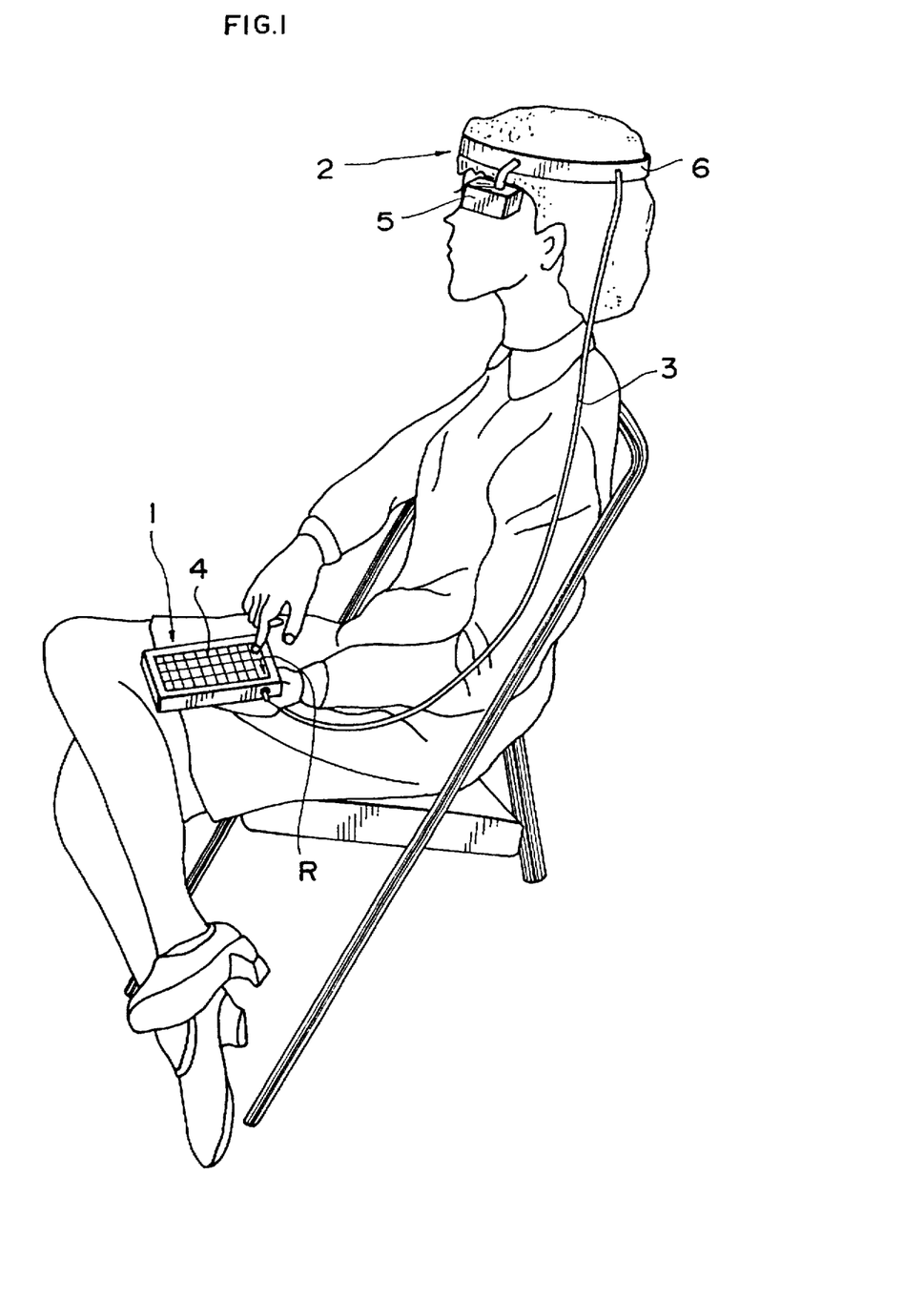
FIG. 1 is a perspective view showing a personal computer equipped with a display device of a first embodiment of the present invention, said personal computer being in use.

The embodiments of the present invention are described below with reference to the drawings. FIGS. 1 through 5 show a first embodiment in which the present invention is applied in a display device of an ultra-small personal computer used as a data processing apparatus. FIG. 1 shows the ultra-small personal computer equipped with the device of this embodiment in use. In this drawing, 1 is a main unit of the ultra-small personal computer and 2 is a head monitor device, the display device of this embodiment. 1 and 2 are electrically connected by cable 3.

Computer main unit 1 has a public-domain construction comprising a CPU to perform data processing, a memory for memory purposes, a micro-processor having I/O chips, etc. for inputting and outputting (not shown in the drawing) and keyboard 4 for the input operation. It has two types of game functions in addition to such various functions as word processor, spreadsheet, calculator and address book and is constructed to have such dimensions that it can be held in the palm of the hand, as shown in the drawing.

On the other hand, head monitor device 2 comprises monitor main unit 5 attached to an appropriate area of ring-shaped headband 6 which works as a support unit to mount monitor main unit 5 on the head of the observer. Said cable 3 is drawn from headband 6 and connected to a connector of computer main unit 1.

Figure 2:
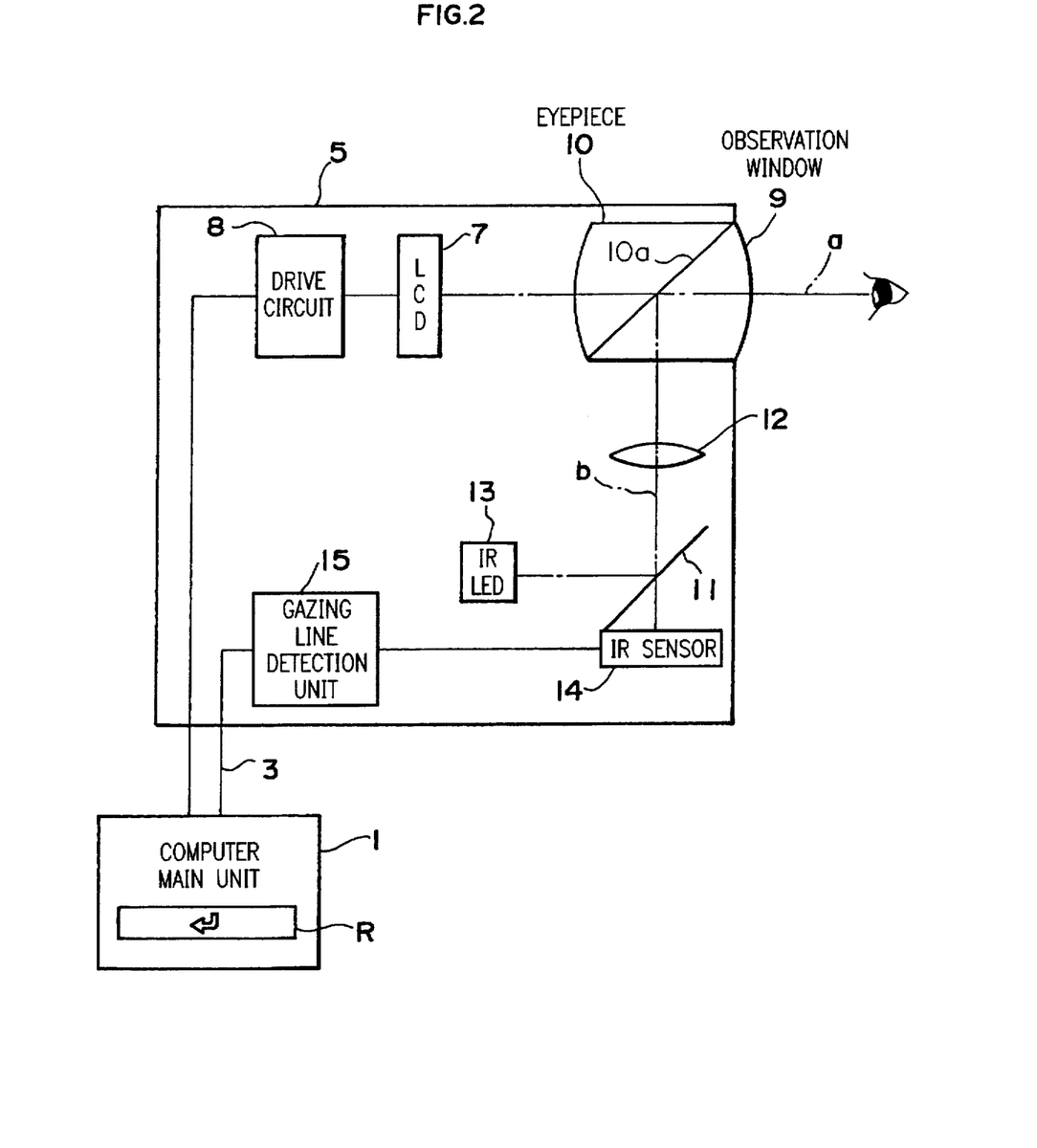
FIG. 2 is a block diagram showing the construction of a head monitor device.

FIG. 2 shows the construction of head monitor device 2. In this drawing, 7 is an LCD (liquid crystal display), a display means, which displays an image on the liquid crystal screen as a monitor of computer main unit 1. 8 is an LCD drive circuit, which drives LCD 7 based on signals from computer main unit 1.

LCD 7 is located on the same axis as observation window 9 located in front of monitor main unit 5. Eyepiece 10 for observing the image of computer main unit 1 displayed on LCD 7 is attached to this observation window 9. This eyepiece 10 has a semitransparent surface 10a among its lenses, which functions as a light divider. The image displayed on LCD 7 is transmitted through said semitransparent surface 10a and progresses along optical axis a toward observation window 9, whereupon it reaches the eye of the observer wearing head monitor device 2.

11 is a half-mirror located on optical axis b, which is created after a is divided by semitransparent surface 10a of eyepiece 10; 12 is a condenser located on optical axis b and between eyepiece 10 and half-mirror 11; and 13 is an infrared LED. The infrared beam emitted from this infrared LED 13 is refracted by almost 90° on half-mirror 11 and reaches the eye of the observer via condenser 12 and semitransparent surface 10a of eyepiece 10.

14 is an infrared area sensor located on optical axis b behind half-mirror 11. It receives the infrared beam reflected by the eye of the observer via semitransparent surface 10a of eyepiece 10, condenser 12 and half-mirror 11. 15 is a gazing line detection unit, electrically connected to infrared area sensor 14, which detects the position of the gazing line of the observer based on the output from infrared area sensor 14, and sends that information to computer main unit 1 through cable 3. Incidentally, a public-domain construction may be used for the specific construction for the detection of the position of the observer's gazing line using gazing line detection unit 15.

Furthermore, computer main unit 1 carries out prescribed processing described below based on an observation position signal outputted from gazing line detection unit 15. The execution of this processing is prompted by operating an input instruction switch (not shown in the drawing) built into computer main unit 1 through the operation of return key R, for example, of keyboard 4.

The operation of the display device of said construction will now be explained. The user, i.e., the observer, can place the image displayed on LCD 7 into her field of view by wearing headband 6 of head monitor device 2 on her head and positioning monitor main unit 5 such that eyepiece 10 comes in contact with one eye. The observer performs data inputting by pressing return key R of computer main unit 1 while wearing the device in said manner and viewing the image displayed on LCD 7. When doing so, the observer moves her gazing line to a part of the image which she needs.

When the observer is moving her gazing line, her eyeball moves in accordance with the direction of the movement. With regard to this movement of the eyeball, an infrared signal emitted from infrared LED 13 toward the eyeball and reflected by the eyeball is received by infrared area sensor 14 via semitransparent surface 10a of eyepiece 10, condenser 12 and half-mirror 11, and the position of the observer's gazing line is detected by gazing line detection unit 15 based on the output from said infrared area sensor 14.

The position of the gazing line detected by gazing line detection unit 15 is sent to computer main unit 1 from said gazing line detection unit 15 as an observation position signal via cable 3. Computer main unit 1 displays a cursor at a position corresponding to the gazing line on the display screen of LCD 7 based on said observation position signal. Therefore, the cursor is displayed by computer main unit 1 at the point at which the user is looking. In other words, when the observer moves her gazing line to another point, the cursor moves on the display screen together with said movement. After that, in the same manner as a standard computer, data inputting can be performed by the observer operating return key R with the cursor positioned at a desired point.

Figure 3:
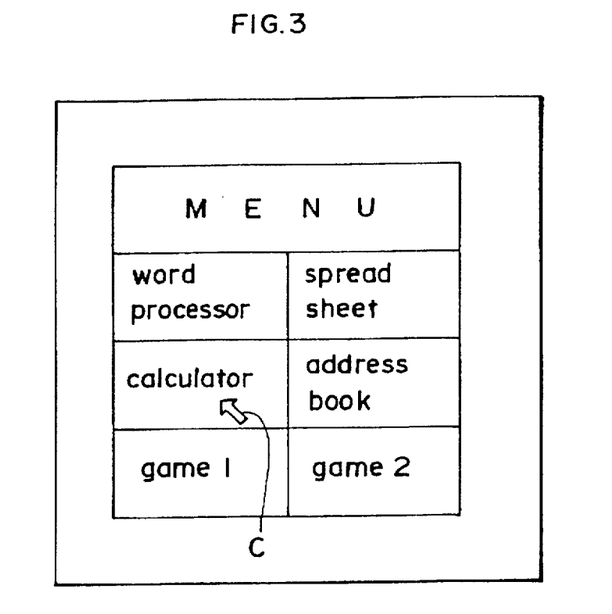
FIG. 3 is a front elevation showing one example of an LCD display screen.
Figure 4:
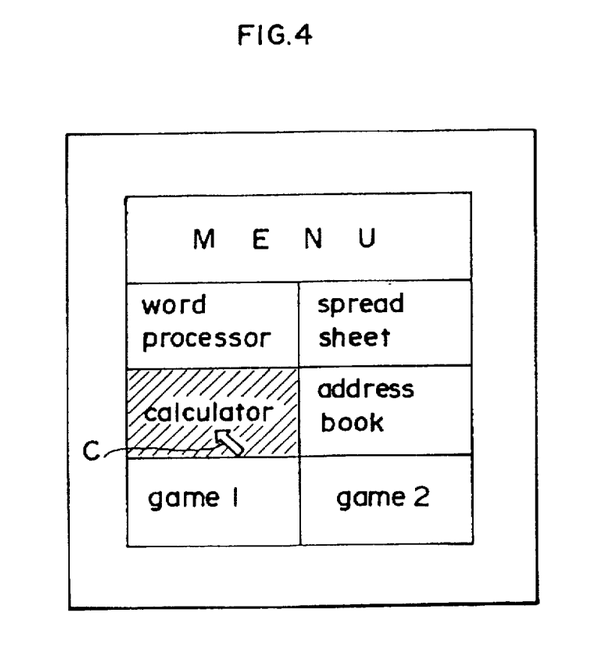
FIG. 4 is a front elevation showing the appearance of said LCD display screen after inputting is performed.

FIGS. 3 and 4 show examples of the display of LCD 7. The display screen shown in FIG. 3 is a menu screen showing processing tasks that can be performed by computer main unit 1. In this display screen, if return key R is operated after cursor C is moved to a desired point by the observer moving her gazing line-for example, as shown in FIG. 3, after cursor C is moved to the 'calculator' menu among the processing tasks, the input instruction switch is turned ON, and, as shown in FIG. 4, the 'calculator' menu, which the cursor is pointing to, is selected.

Figure 5:
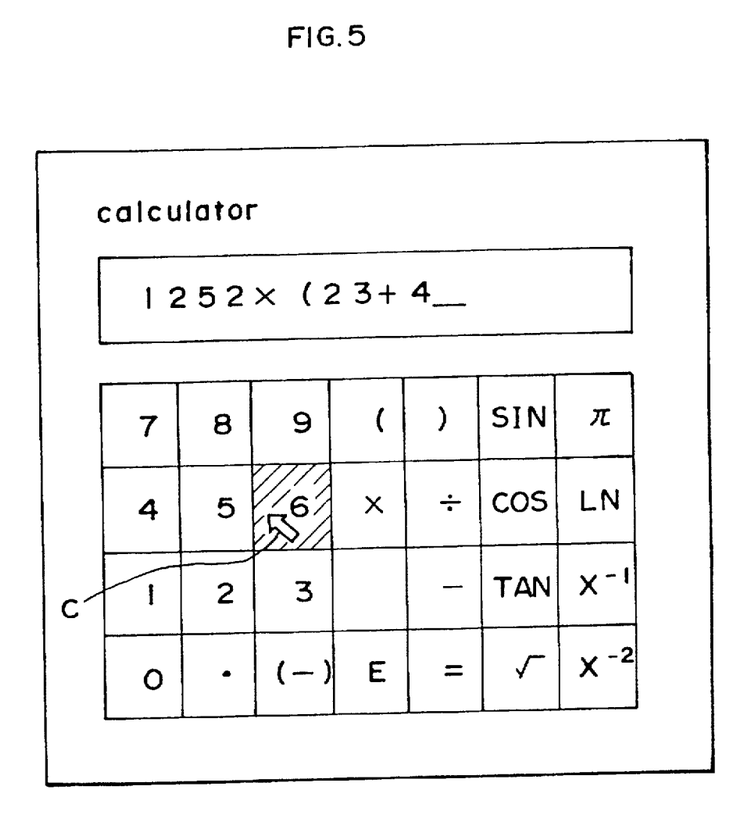
FIG. 5 is a front elevation showing the appearance of said LCD display screen when the 'calculator' menu is selected.

FIG. 5 shows the display screen of LCD 7 when the screen is switched to the 'calculator' menu. When the input instruction switch is turned ON again after the 'calculator' menu is selected, as shown in FIG. 5, the display screen is switched to the selected menu, or the calculator, and the indicated program initiates. Then input instruction to computer main unit 1 is carried out by repeating the movement of the gazing line and turning ON the input instruction switch.

As shown in FIG. 5, for example, when calculation 1252×(23+4 ... ) is performed, by moving the gazing line to '1' shown as a key on the display screen, which moves cursor C to that position, and pressing return key R, '1' is shown in the formula display area. Then the gazing line is moved to '2' in the same manner and return key R is pressed. By repeating these operations, input operation can be executed in the same manner as when a mouse or track ball is used.

In said embodiment, an LCD is used as a display means, but a different kind of display means such as a display means comprising lines scanned by a mirror, as disclosed in U.S. Pat. No. 4,934,773, for example, would also be acceptable. In addition, in said embodiment, the observation optical system has single eyepiece 10 so that observation is made using one eye only; however, a construction in which the display means is observed using both eyes, as shown in FIGS. 6 or 7, for example, may be used.

Figure 6:
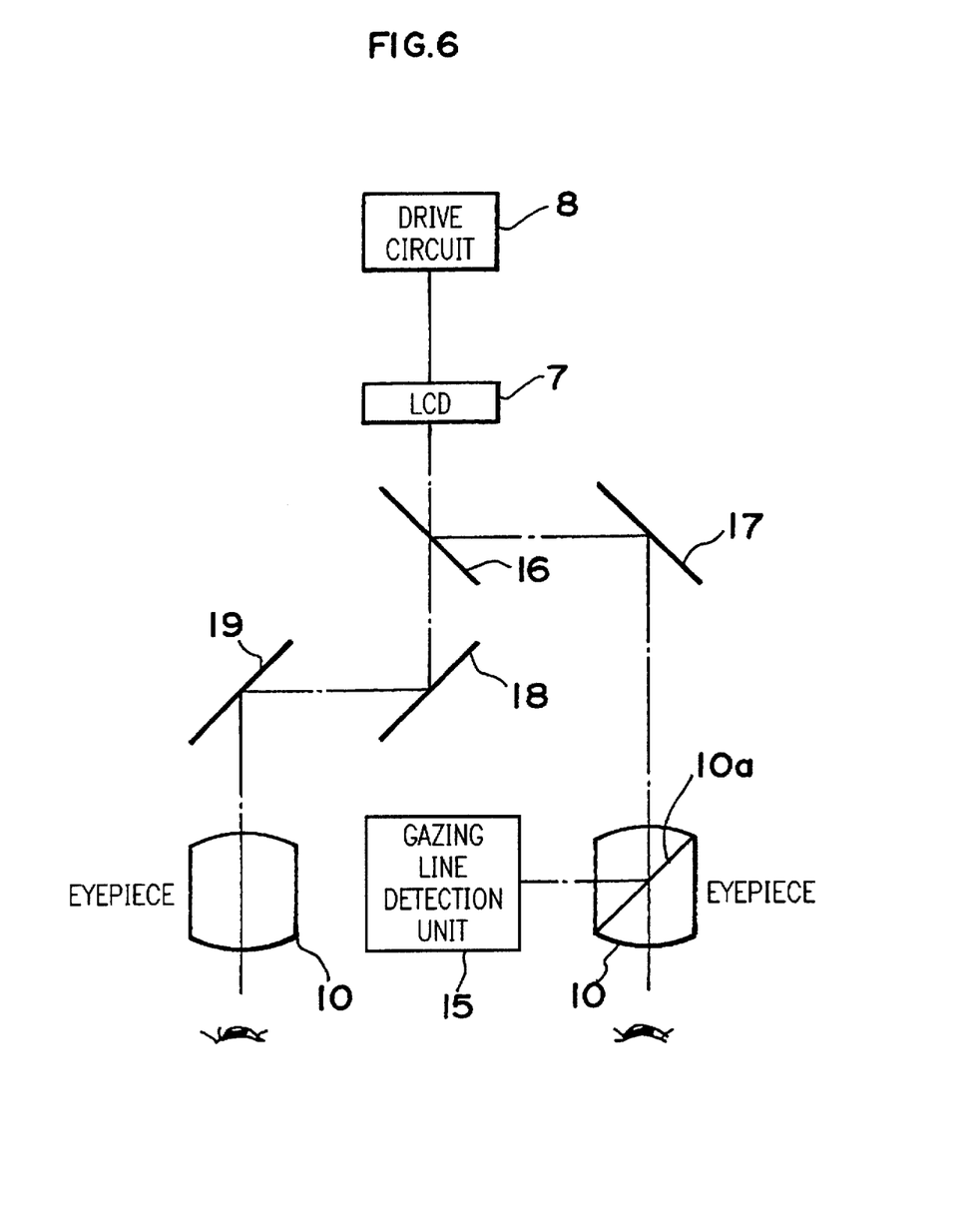
FIG. 6 is a block diagram showing another form of the head monitor device.

In the construction shown in FIG. 6, as the observation optical system of head monitor device 2, a pair of eyepieces 10 are used to correspond to both eyes, and semitransparent surface 10a is formed on one of eyepieces 10. The display image of LCD 7 goes into one eyepiece 10 after being refracted by half-mirror 16 and reflection mirror 17 while it also passes through half-mirror 16 and goes into the other eyepiece 10 after being reflected by reflection mirrors 18 and 19. In this case, gazing line detection unit 15 need only be present for one eye.

Figure 7:
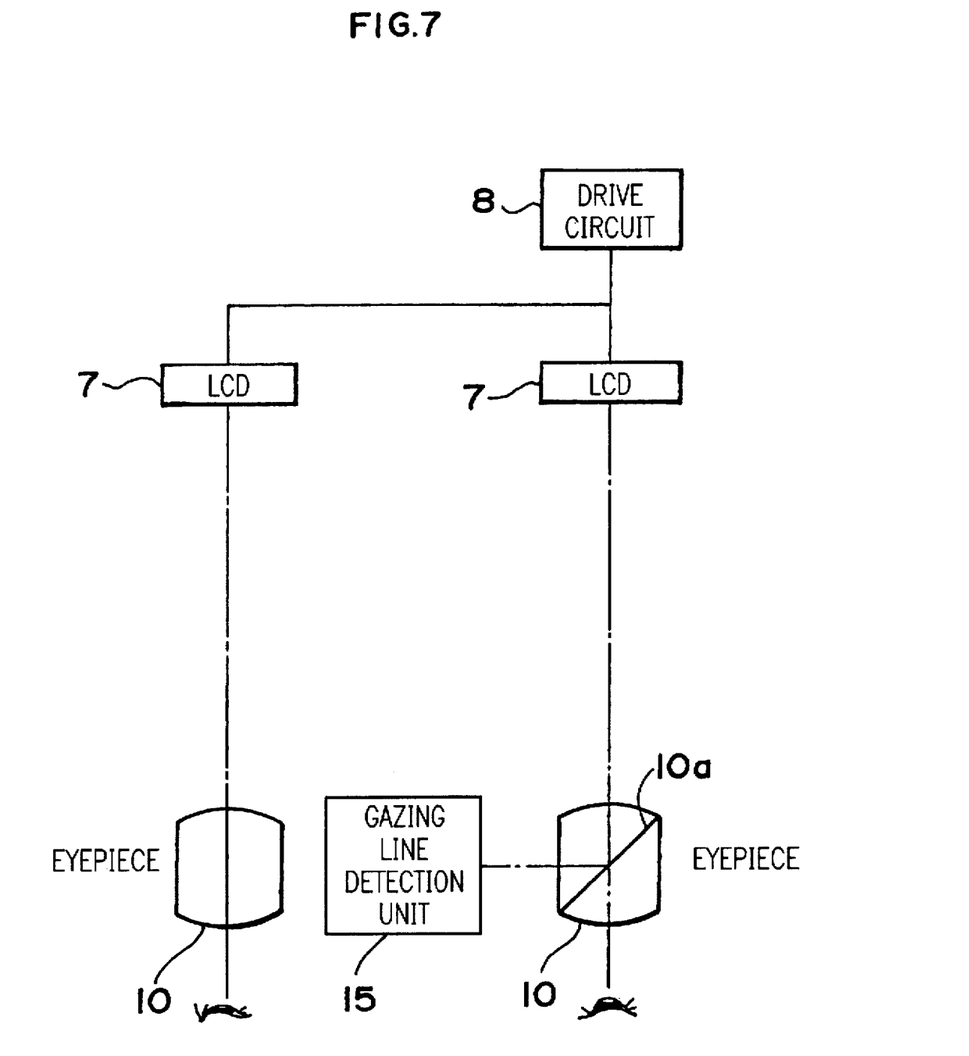
FIG. 7 is a block diagram showing yet another form of the head monitor device.

In the construction shown in FIG. 7, as the observation optical system of head monitor device 2, while a pair of eyepiece 10 are used to correspond to both eyes, separate LCDs 7 are located for each eye, such that the position of the gazing line is determined by regulating these LCDs 7 via LCD drive circuit 8. In this case as well, gazing line detection unit 15 need only be present for one eye.

Figure 8:
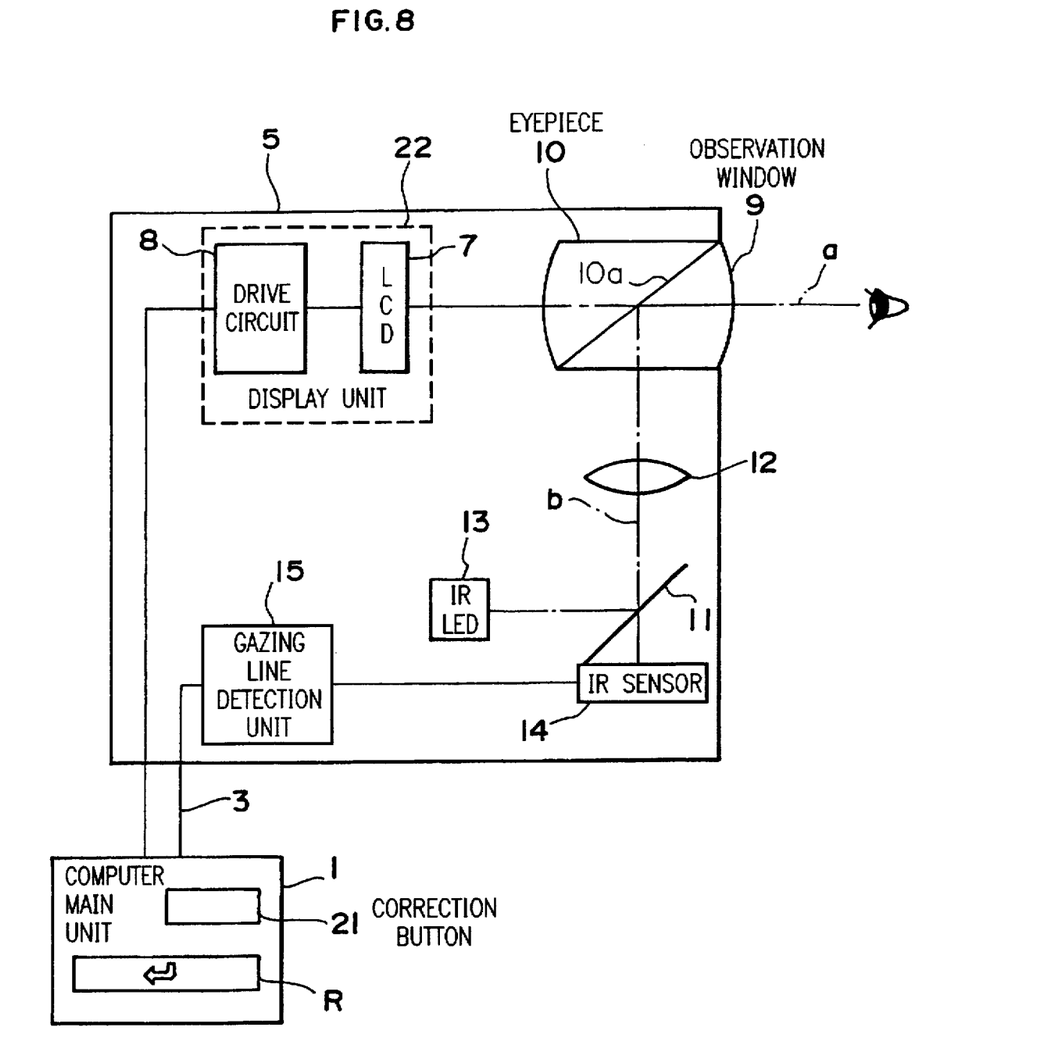
FIG. 8 is a block diagram showing the construction of the head monitor device in a display device of a second embodiment of the present invention.

FIGS. 8 through 11 show a second embodiment of the present invention. FIG. 8 shows the construction of head monitor device 2. In this drawing, correction button 21, which works as an operating member, is located on the keyboard of computer main unit 1. This correction button 21 is pressed to correct any discrepancy existing between the position indicated by cursor C on the display screen of LCD 7 and the point the observer is actually looking at. This correction button 21 does not necessarily need to be located on the keyboard separate from other keys: a designated key on the keyboard may be given that function. Because other components and operations shown in FIG. 8 are in principle identical to those in said first embodiment, the same numbers are used for the shared components and their explanations are omitted in order to avoid repetition.

Figure 9:
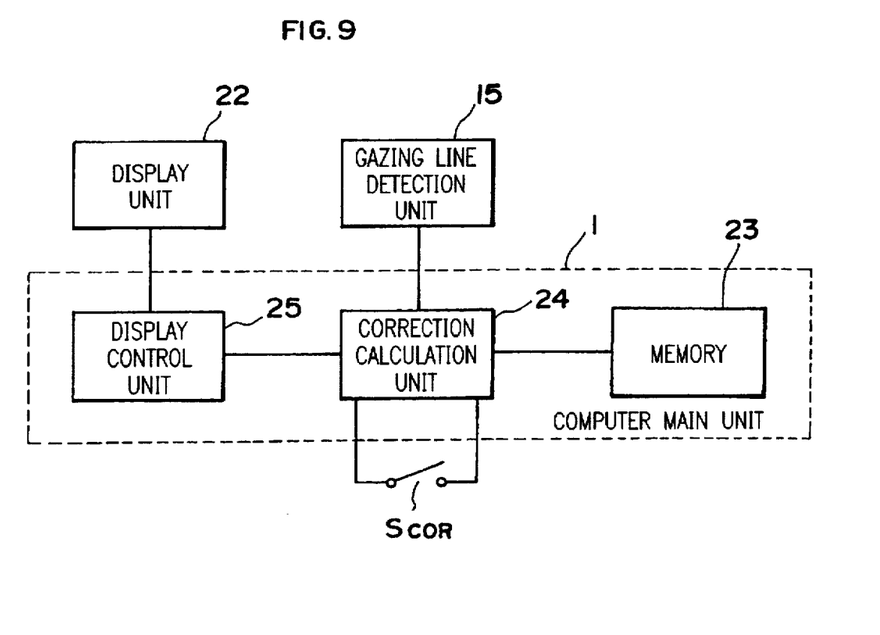
FIG. 9 is a block diagram showing the construction of a gazing line direction correction unit.

FIG. 9 shows a gazing line direction correction unit comprising computer main unit 1, display unit 22 comprising LCD 7 and LCD drive circuit 8, and gazing line detection unit 15. In this drawing, memory 23, correction calculation unit 24 and display control unit 25 are constructed in ROM in computer main unit 1.

Memory 23 saves data regarding the amount of discrepancy between the position of the gazing line detected by gazing line detection unit 15 and the actual position of the gazing line, or in other words, correction data. Correction calculation unit 24 calculates the corrected position of the gazing line based on the position of the gazing line output from gazing line detection unit 15 and the correction data from memory 23 and outputs the calculation result. Display control unit 25 inputs the corrected position of the gazing line while it calculates the display position on display unit 22 and causes said display unit 22 to display. SCOR is a correction switch to turn correction calculation unit 24 ON and OFF. It turns ON when correction button 21 is pressed.

Figure 10:
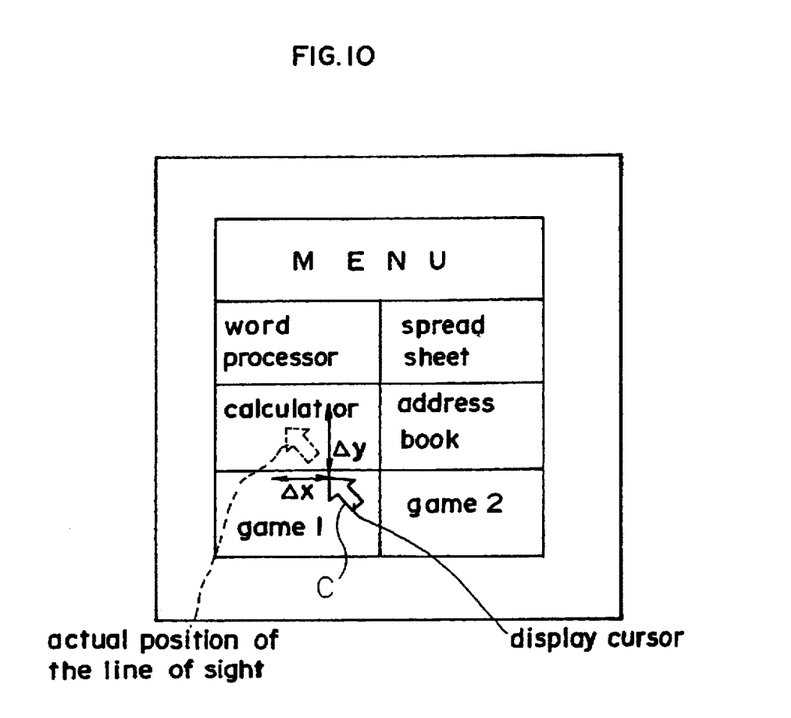
FIG. 10 is a front elevation showing one example of a discrepancy in terms of the direction of the gazing line on the LCD display screen.

FIG. 10 shows a situation in which the position indicated by display cursor C and the actual position of the gazing line do not match. In the situation shown in this drawing, there exist discrepancies of Dx and Dy between the position of a solid-line cursor C and the actual position of the gazing line shown by a dotted line, along lateral axis x and vertical axis y, respectively. As a result, where the observer wishes to select the 'calculator', if return key R were pressed in this state, game 1 would be selected.

In order to properly select the 'calculator'.in this state, it would be necessary to move the gazing line until the position of display cursor C and the actual position of the gazing line match, which would make the monitor very difficult to use. In other words, in order to match the actual position of the gazing line and cursor C, it is necessary to add Dx and Dy to the correction data currently used.

Figure 11:
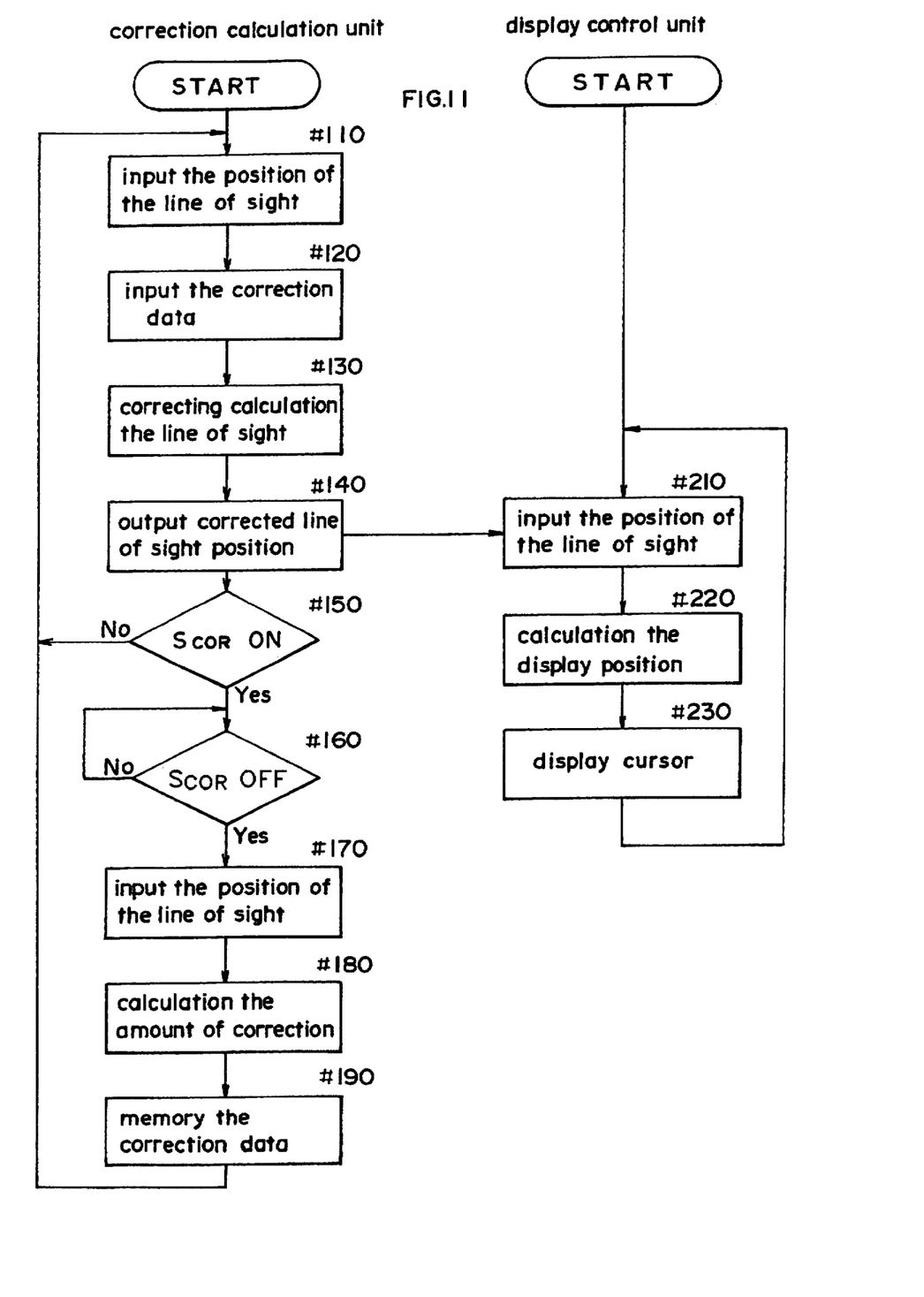
FIG. 11 is a flow chart showing the operations of the correction calculation unit and display control unit.

In this embodiment, this correction of the discrepancy in the detection of the gazing line is carried out via a simple operation. In other words, FIG. 11 is a flow chart showing the operations of correction calculation unit 24 and display control unit 25. In this drawing, in correction calculation unit 24, first, in step #110, the data on the position of the gazing line is inputted from gazing line detection unit 15, and the correction data is inputted from memory 23 in step #120. Then, in step #130, the actual position of the gazing line is calculated by correcting the gazing line position data using the correction data, and in step #140 the calculated gazing-line position data is outputted to display control unit 25.

In steps #150 and #160, it is determined whether correction switch SCOR is ON or OFF, i.e., whether or not correction button 21 has been pressed, and if it is determined that correction switch SCOR has not been pressed, step #110 is returned to, whereupon the above operations are repeated; if it is determined that correction switch SCOR has been pressed, the monitor advances to step #170 after SCOR is released, to input gazing line position data from gazing line detection unit 15, after which the amount of discrepancy (the amount of correction) between the gazing line position data calculated in step #140 performed immediately before correction switch SCOR is turned ON, or namely, the current position at which cursor C is displayed, and the gazing line position data inputted in step #170 is calculated in step #180, and the calculated correction amount is saved into memory 23 in step #190 as correction data.

On the other hand, when the corrected gazing line position is outputted in step #140 in correction calculation unit 24, in display control unit 25, the data is simultaneously inputted in step #210. Then the display position on display unit 22 is calculated in step #220 and display unit 22 is caused to display cursor C in step #230.

In correction calculation unit 24 and display control unit 25 described above, the gazing line position detected via the operations of correction calculation unit 24 from step #110, in which the gazing line position is inputted, through step #150, in which it is determined whether or not correction switch SCOR is ON, and the operations of display control unit 25 from step #210, where the gazing line position is inputted, through step #230, where the cursor is displayed, is displayed on display screen LCD 7 on a real-time basis.

If it is determined in step #150 that correction switch SCOR is ON, the monitor advances to step #160 and the determination regarding whether correction switch SCOR is turned OFF is repeated until it is turned OFF, during which period inputting regarding the gazing line position is not performed.

Therefore, the position of the cursor on the LCD display screen does not change from the display position based on the data output in step #140 performed immediately before correction switch SCOR is turned ON.

The observer therefore orients her gazing line to cursor C in the state in which the cursor is thus displayed. Then, when correction switch SCOR is turned OFF, the amount of discrepancy is calculated based on the gazing line position at that time and the previous corrected gazing line position (the position at which the cursor was displayed at that time), and this amount of discrepancy is then saved in memory 23 as the latest correction data. The process then returns to step #110, in which the gazing line position is inputted and corrected by the latest correction data whereupon it is indicated by the cursor, as a result of which the gazing line position and cursor C thereafter match.

As described above, using the present invention, when the image displayed on a display means is seen through an observation optical system, the observer's gazing line is detected by a gazing line detection means and prescribed processing is carried out by a processing means based on a signal related to the detected observation position. As a result, the inconvenience that occurs when inputting is performed using an input method in which a mouse, etc. is involved, namely the need to have a table, etc. on which the mouse is operated, is eliminated, and the limitations in the selection of the location where the computer is used, as well as such operational problems of a high degree of eye fatigue due to the need to move the mouse by hand and visually follow the cursor, are completely eliminated, and a display device most suitable for small personal computers may be realized. In addition, since the display device is constructed such that the small display means is enlarged when viewed through the observation optical system, a large amount of information may be displayed without increasing the size of the computer.

In addition, gazing line position data is inputted from the gazing line detection means and correction data is inputted from a memory means, whereupon the gazing line position data is corrected by the correction data, and the actual position of the gazing line is calculated, which is then outputted to a display control means, and it is subsequently determined whether or not the corrective operation took place, and if it is determined that it did take place, the gazing line position data is inputted from the gazing line detection means and the amount of discrepancy between that gazing line position data and the gazing line position data calculated immediately beforehand is calculated, whereupon the calculated amount of correction is saved in the memory means as correction data. Therefore, adjustment can be made through a simple operation performed by the correction means, and only a minimal number of movements of the gazing line are required for the purpose of adjustment.

Further, since the construction is such that the correction means is equipped with an operation member and a prohibition means is active while this operation member is being operated, adjustment can be made simply by turning one switch ON and OFF via the operation member, for example, and moreover, since the position of the gazing line is not changed during the adjustment due to the operation of the prohibition means, observation is easy and a change in the position of the gazing line can be easily confirmed by moving the position of the gazing line after the adjustment.

Furthermore, because the observation optical system is attached to a support unit mountable to the head of the observer, she can freely use both hands by mounting the support unit to her head, which enables her to freely operate the keyboard, etc., for example, while visually following the displayed content of the display means, providing better ease of use.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A display device, comprising:
a display on which an image is displayed;
gazing line detection means for detecting a direction of a gazing line of an observer who observes said display;
a memory which saves correction data regarding a discrepancy between a detected direction of the gazing line and an actual direction of the gazing line;
correction means which corrects a thus detected direction of the gazing line based on the correction data saved by said memory;
display control means which displays a position of the gazing line on said display based on the direction of the gazing line as corrected by said correction means;
displayed position storage means for storing the position of the gazing line displayed by said display control means; and
calculation means which calculates the correction data regarding a discrepancy between the position of the gazing line stored by said displayed position storage means and the detected direction of the gazing line.

2. A display device as claimed in claim 1, further comprising a first observation optical system for a right eye and a second observation optical system for a left eye, at least one of the first observation optical system and the second observation optical system accommodating said gazing line detection means.

3. A display device as claimed in claim 1, wherein the display device is adapted to be connected to a computer.

4. A display device as claimed in claim 1, further comprising:

adjustment instructing means for instructing a start of an adjustment and an end of an adjustment; and wherein, when said adjustment instruction means instructs the start of the adjustment, said displayed position storage means stores the position of the gazing line displayed by said display control means, and wherein, when said adjustment instruction means instructs the end of the adjustment, said calculation means calculates the correction data regarding a discrepancy between the position of the gazing line stored by said displayed position storage means and the detected direction of the gazing line.

5. A display device as claimed in claim 4, further comprising conversion means which converts the correction data saved in said memory to the correction data calculated by said calculation means.

6. A display device as claimed in claim 1, further comprising conversion means which converts the correction data saved in said memory to the correction data calculated by said calculation means.

7. A display device as claimed in claim 1, further comprising an inhibiting means for inhibiting a change in the position of the gazing line displayed by said display control means on said display regardless of a changing of the gazing line of the observer.

8. Apparatus comprising:

a display on which an image can be displayed;

a gazing line detector for detecting a direction of a gazing line of an observer who observes said image on said display;

a memory which saves correction data;

a correction device which corrects a thus detected direction of the gazing line based on the correction data saved in said memory;

a display controller which displays an indicator at a position on said display representing a calculated position of the gazing line on said display based on the detected direction of the gazing line as corrected by said correction device;

a displayed position storage device for storing the position of said indicator on said display; and a calculation device which calculates new correction data regarding a discrepancy between said position of said indicator which is stored by said displayed position storage device and a direction of the gazing line which is detected by said gazing line detector, and which replaces the correction data saved in said memory with the new correction data.

9. Apparatus in accordance with claim 8, further comprising a holder which is adapted to hold said display and said gazing line detector on a head of the observer.

10. Apparatus in accordance with claim 9, further comprising a portable computer which is connected by cable to said display and said gazing line detector.

11. Apparatus in accordance with claim 10, wherein said portable computer can be held by one hand, and wherein said portable computer is provided with at least one input key so the operator can perform inputting to said portable computer by pressing an input key while directing the gazing line toward a desired portion of the image displayed on said display.

12. Apparatus in accordance with claim 8, further comprising a first observation optical system for a right eye and a second observation optical system for a left eye, at least one of the first observation optical system and the second observation optical system accommodating said gazing line detector.

13. Apparatus in accordance with claim 8, further comprising a portable computer which is connected by cable to said display and said gazing line detector.

14. Apparatus in accordance with claim 8, further comprising a computer having at least one input key so the operator can perform inputting to said computer by pressing an input key while directing the gazing line toward a desired portion of the image displayed on said display.

15. Apparatus in accordance with claim 8, further comprising a processor for executing prescribed processing based on the direction of the gazing line detected by said gazing line detector and a state of the image displayed on said display.

16. Apparatus in accordance with claim 8, further comprising an image controller for changing the image displayed on said display based on the direction of the gazing line detected by said gazing line detector and the image displayed on said display.

17. Apparatus in accordance with claim 8, further comprising a prohibition device for preventing any change in the position of the indicator on the display during said adjustment period.

18. An apparatus as claimed in claim 8, further comprising:

an adjustment instructing device for instructing a start of an adjustment and an end of the adjustment; and wherein, when said adjustment instruction device instructs the start of the adjustment, said displayed position storage device stores the position of said indicator on said display, and wherein, when said adjustment instruction device instructs the end of the adjustment, said calculation device calculates new correction data regarding a discrepancy between said position of said indicator which is stored by said displayed position storage device and a direction of the gazing line which is detected by said gazing line detector.

19. Apparatus in accordance with claim 18, wherein said adjustment instructing device includes a key, wherein an actuation of the key initiates the start of the adjustment.

20. An apparatus as claimed in claim 8, further comprising an inhibiting means for inhibiting a change in the position of the gazing line displayed by said display control means on said display regardless of a changing of the gazing line of the observer.

21. Apparatus comprising:

a display on which an image can be displayed;

a gazing line detector for detecting a direction of a gazing line of an observer who observes said image on said display;

a memory which saves correction data;

a correction device which corrects a thus detected direction of the gazing line based on the correction data saved in said memory;

a display controller which displays an indicator at a position on said display representing a position of the gazing line on said display based on the detected direction of the gazing line as corrected by said correction device;

a displayed position storage device for storing the position of said indicator on said display; and a calculation device which calculates new correction data regarding a discrepancy between the position of said indicator which is stored by said displayed position storage device and a direction of the gazing line which is detected by said gazing line detector, and for replacing the correction data saved in said memory with the new correction data.

22. Apparatus in accordance with claim 21, further comprising a computer having at least one input key so the operator can perform inputting to said computer by pressing an input key while directing the gazing line toward a desired portion of the image displayed on said display.

23. Apparatus in accordance with claim 22, further comprising a holder which is adapted to hold said display and said gazing line detector on a head of the observer, and wherein said computer is connected by cable to said display and said gazing line detector.

24. Apparatus in accordance with claim 23, further comprising a prohibition device for preventing any change in the position of the indicator on the display during said adjustment period.

25. Apparatus in accordance with claim 21, further comprising a prohibition device for preventing any change in the position of the indicator on the display during said adjustment period.

26. An apparatus as claimed in claim 21, wherein said displayed position storage device stores the position of said indicator on said display at a start of an adjustment period, and wherein said calculation device calculates th e new correction data when said adjustment period ends.

27. Apparatus in accordance with claim 26, further comprising a key, wherein the actuation of the key initiates a start of an adjustment period.

28. An apparatus as claimed in claim 21, further comprising an inhibiting means for inhibiting a change in the position of the indicator displayed by said display controller on said display regardless of a changing of the gazing line of the observer.

* * * * *

UNITED STATES PATENT AND TRADEMARK OFFICE
CERTIFICATE OF CORRECTION

PATENT NO.  : 5,790,099
DATED       : August 4, 1998
INVENTOR(S) : Hiroyuki Okada It is certified that error appears in the above-identified patent and that said Letters Patent is hereby corrected as shown below:

Title page,
Item [21] Appl. No.:, delete "912,458", and insert -- 08/912,458 --.
Item [63] Related U.S. Application Data, delete "436,881,", and insert -- 08/436,881--.
Item [30] Foreign Application Priority Data, insert -- March 1, 1995
[JP] Japan 7-042123 --.

Column 10,
Line 30, (claim 17, line 2), after "comprising", insert -- adjustment instructing means for instructing a start of an ajustment period and an end of the ajustment period; and--.
Line 54-55 (claim 20, lines 3-4), delete "control means", and insert -- controller --.

Column 12,
Line 2, (claim 24, line 2), after "comprising", insert --adjustment instructing means for instructing a start fo an adjustment period and an end of the adjustment period; and --.
Line 6, (claim 25, line 2), after "comprising", insert -- adjustment instructing means for instructing a start of an adjustment period and an end of the adjustment period; and --.
Line 12, (claim 26, line 4), delete "th e" and insert -- the -- . --

Signed and Sealed this

Fourth Day of September, 2001

*Attest:*

NICHOLAS P. GODICI
*Attesting Officer*    *Acting Director of the United States Patent and Trademark Office*